Feb. 23, 1971   F. BESCRIPT   3,564,815
BANDING MACHINE
Filed Jan. 12, 1968   9 Sheets-Sheet 4

INVENTOR
FREDERICK BESCRIPT
BY
ATTORNEYS

Feb. 23, 1971  F. BESCRIPT  3,564,815
BANDING MACHINE

Filed Jan. 12, 1968  9 Sheets-Sheet 6

INVENTOR
FREDERICK BESCRIPT
BY
ATTORNEYS

Feb. 23, 1971 F. BESCRIPT 3,564,815
BANDING MACHINE
Filed Jan. 12, 1968 9 Sheets-Sheet 7

INVENTOR
FREDERICK BESCRIPT

BY *Thomas Smith & Hardy*

ATTORNEYS

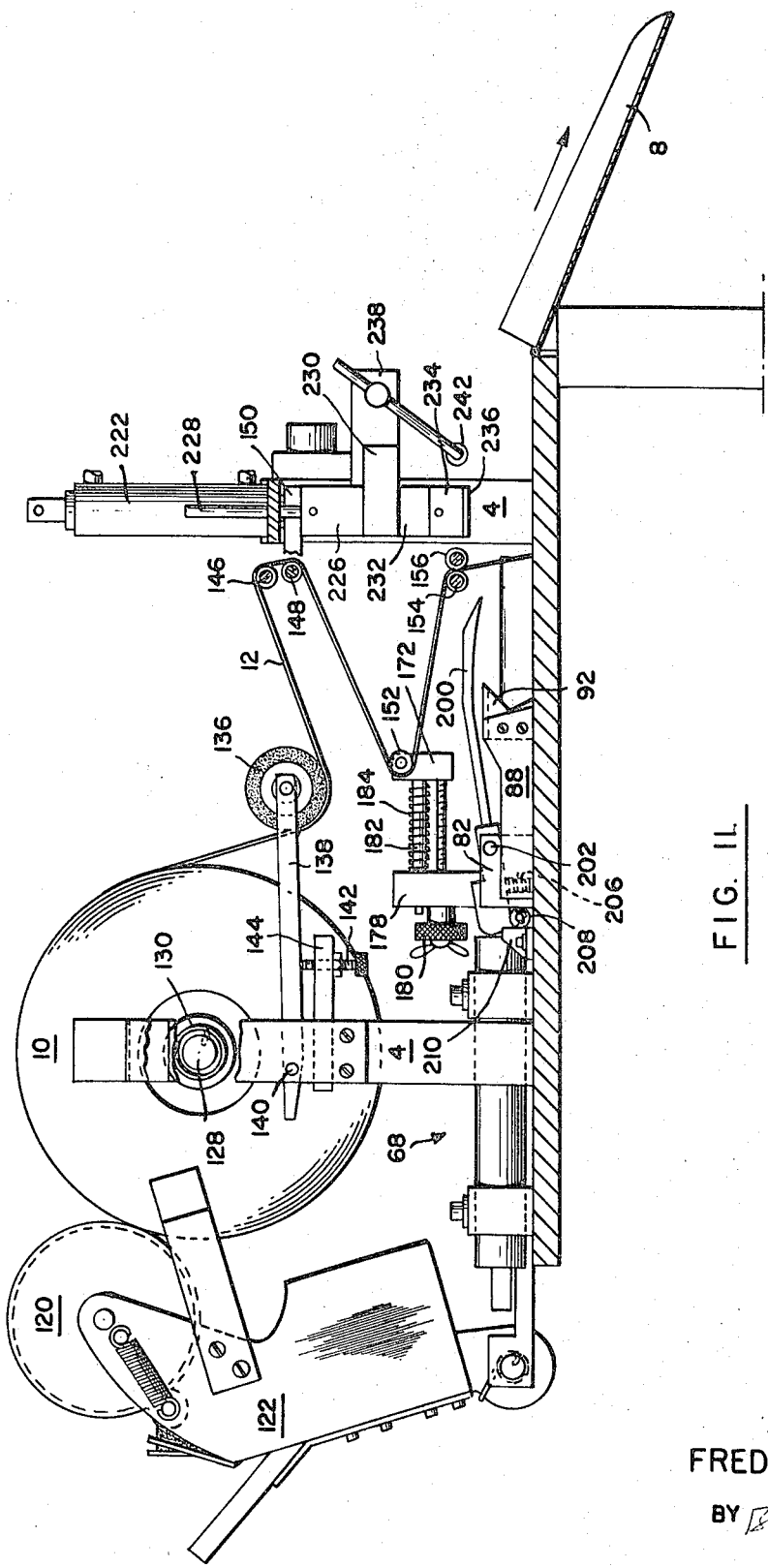

Feb. 23, 1971  F. BESCRIPT  3,564,815
BANDING MACHINE
Filed Jan. 12, 1968  9 Sheets-Sheet 9

INVENTOR
FREDERICK BESCRIPT
BY

ATTORNEYS

United States Patent Office 3,564,815
Patented Feb. 23, 1971

3,564,815
BANDING MACHINE
Frederick Bescript, Cherry Hill, N.J., assignor to Smith
Kline & French Laboratories, Philadelphia, Pa., a corporation of Pennsylvania
Filed Jan. 12, 1968, Ser. No. 697,371
Int. Cl. B65b 13/02, 27/08
U.S. Cl. 53—198          3 Claims

ABSTRACT OF THE DISCLOSURE

Conveyor means position a stack of similar or dissimilar items in a path. An endless strip of banding material extends downwardly through said path and can be held at a position below the path by gripping means. Advancing means urge the stacked items along the path and into the strip to wrap the strip about the stack of items until both the upper and lower portions of the wrapped strip extends in overlapping relation beyond the items. Bonding means unite the overlapped strip together and cutting means cut it to leave a band about the stack of items and the cut portions of the strip bonded together. Means are provided to remove the cut portion of the strip.

BACKGROUND OF THE INVENTION

It is frequently necessary to band together a plurality of similar or dissimilar stacked items. For example, in the pharmaceutical industry, it is frequently required to band a plurality of latch cover physicians samples alone or together with a circular. Heretofore, such banding operations have been relatively slow and have required substantial manpower. It is, therefore, a primary purpose of this invention to provide a banding machine which increases the rate of banding very substantially and reduces the amount of labor involved. The machine of this invention also provides a high degree of uniformity of banding particularly with respect to tightness of the wrap which is readily adjustable. In addition, it controls the problem which has existed heretofore of disposing of messy banding material remanents.

SUMMARY OF THE INVENTION

The invention comprises conveyor means to position a stack of similar or dissimilar items in a path. Strip supply means provide an endless strip of banding material extending downwardly through the path and gripping means are provided to grip the band below the path to hold it when desired. Advancing means are provided to move a stack of items along the path and into the strip of banding material to wrap the strip about the stacked items. Means are provided to bond together opposing flights of the strip and to leave a band about the items and the cut portions of the strip bonded together. Advantageously, there is provided means to continuously remove the cut portions of the strip so as to remove waste material from the banding operation area.

DESCRIPTION OF THE DRAWINGS

FIG. 11 is a vertical section showing block 82 in retracted position.

DESCRIPTION OF PREFERRED EMBODIMENTS

Figure 1:
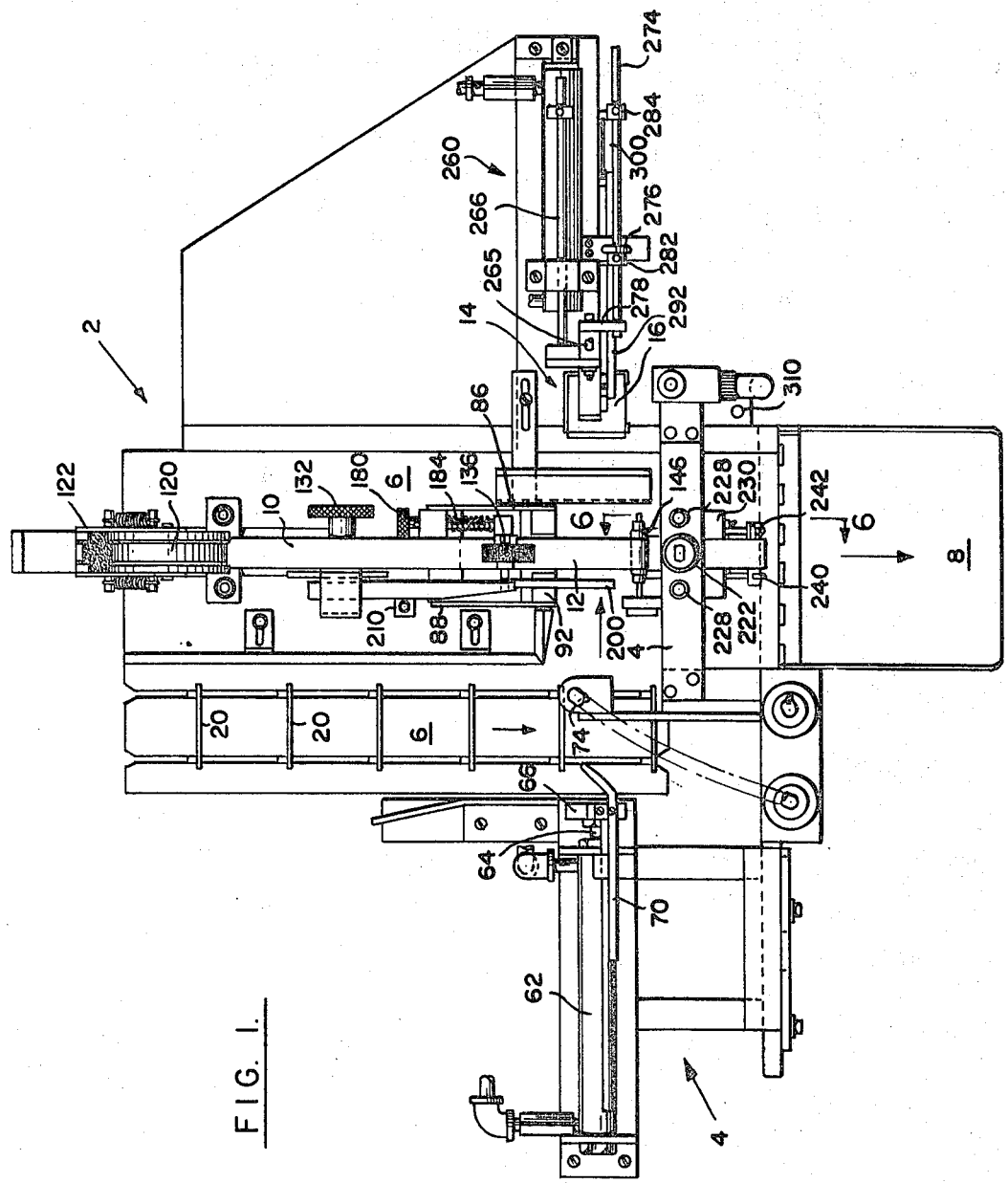
FIG. 1 is a top plan view of a banding machine in accordance with the invention.

Referring first to FIG. 1 by way of general organization, a banding machine 2 has a frame 4 on which is mounted a conveying table 6 at the front end of which is provided a downwardly extending discharge chute 8. Over conveying table 6 is a roll 10 of a strip of banding material indicated at 12. To the right of table 6 as viewed in FIG. 1 is a magazine 14 containing folded circulars 16.

Spaced pushers 20 ride above the surface of table 6 and have downwardly extending legs 22, 22 which pass through grooves 23, 23 in table 6 (FIG. 4) and are each attached to a block 22A secured to chain bracket links 22B (FIG. 5), chain 24 engaging a set of spaced sprockets 26 and 28 mounted to rotate with freely rotatable shafts 30 and 32, respectively. The conveyor thus far described is conventional.

Figure 3:
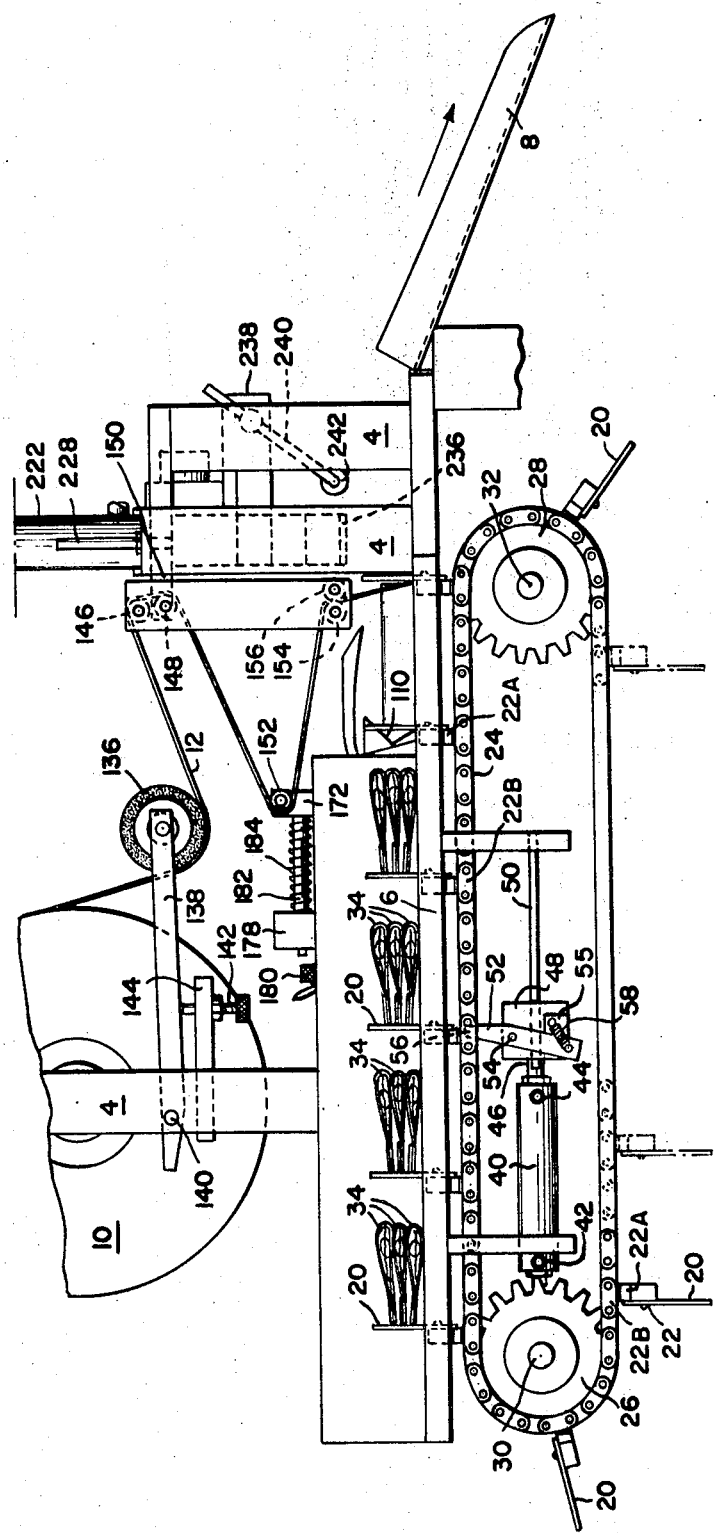
FIG. 3 is an elevation, partially broken away, of the left side of the machine of FIG. 1.

Three latch cover physicians samples 34 are hand fed between each pair of pushers 20 (FIG. 3). As seen in FIG. 3, an air ram 40 connected to hose 42 for the introduction or discharge of air at one end and to hose 44 for the introduction or discharge of air at its other end has a rod 46 connected to a head 48 mounted for sliding on a rod 50 secured to frame 4. Ram 40 is a conventional double acting air ram and is typical of other air rams used in this banding machine. A pawl 52 is pivotally connected at 54 to head 48 and has an upper end which engages the outermost chain 24. Pawl 52 is spring biased in a counterclockwise direction as viewed in FIG. 3 against stop 55 by an extension coil spring 58 secured to the lower end of the pawl and to head 48. Pawl 52 engages the outermost chain 24 between a pair of chain rollers when the ram is being extended to advance pushers 20 to the right as viewed in FIG. 3 and disengages from said chain when the ram is being retracted.

Figure 2:
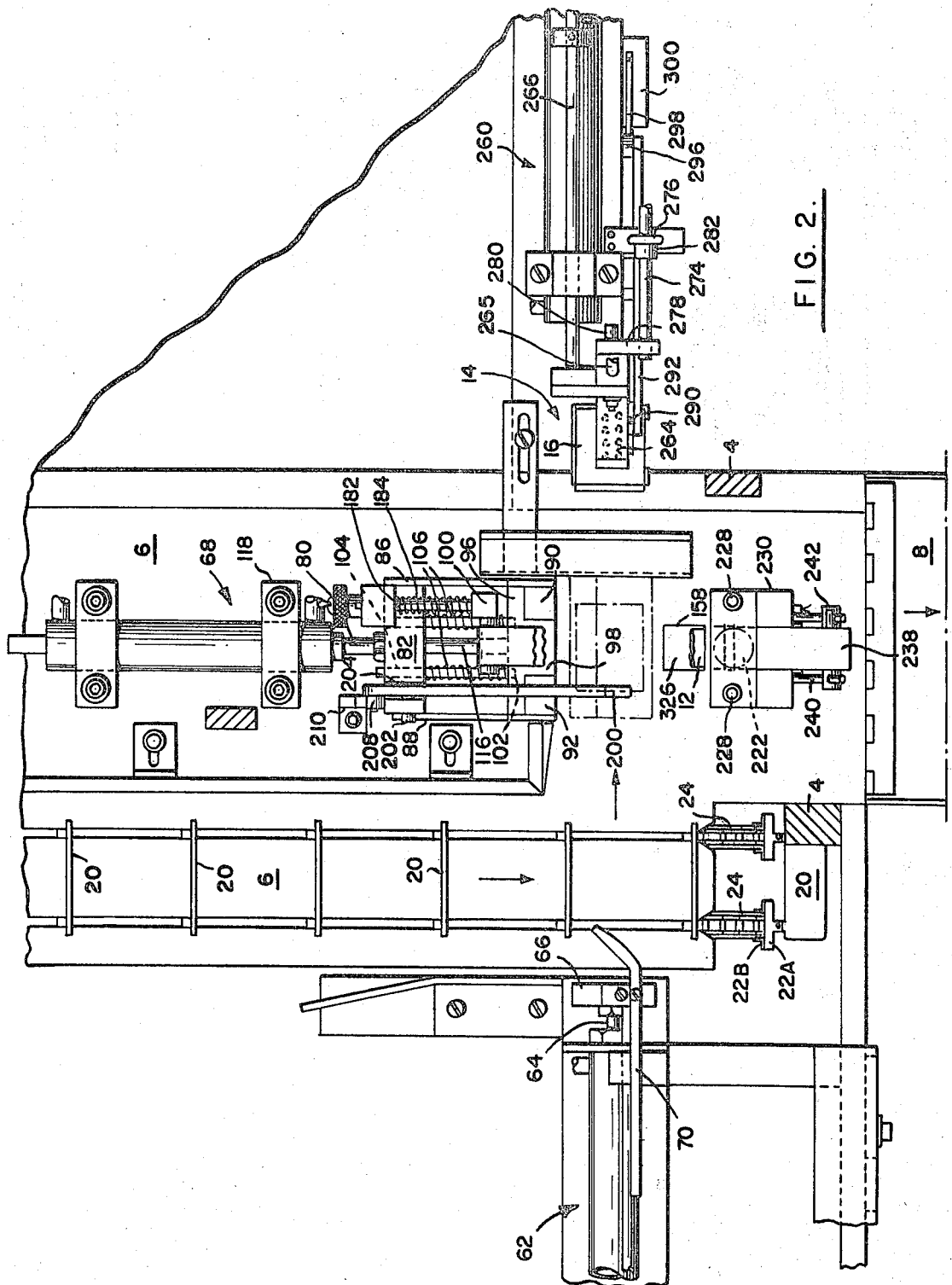
FIG. 2 is an enlarged top plan view of the machine of FIG. 1 partially broken away.

Referring now to FIG. 2, a double acting air ram 62 has a rod 64 to which is secured a pusher head 66 which engages a stack of samples 34 presented by a pusher 20 and advances them to the right as viewed in FIG. 2 to a path having as its center line the center line of ram 68. A bent arm 70 is secured to pusher head 66 to hold switch operating lever 72 of switch 74 (FIG. 4) in the position to which it is pushed by the adjacent stack of samples 34 before it is released by the samples until ram 62 has gone through its extension and most of its retraction cycle to prevent ram 62 from being struck by samples pushed by pushers 20 as is seen later.

Figure 4:
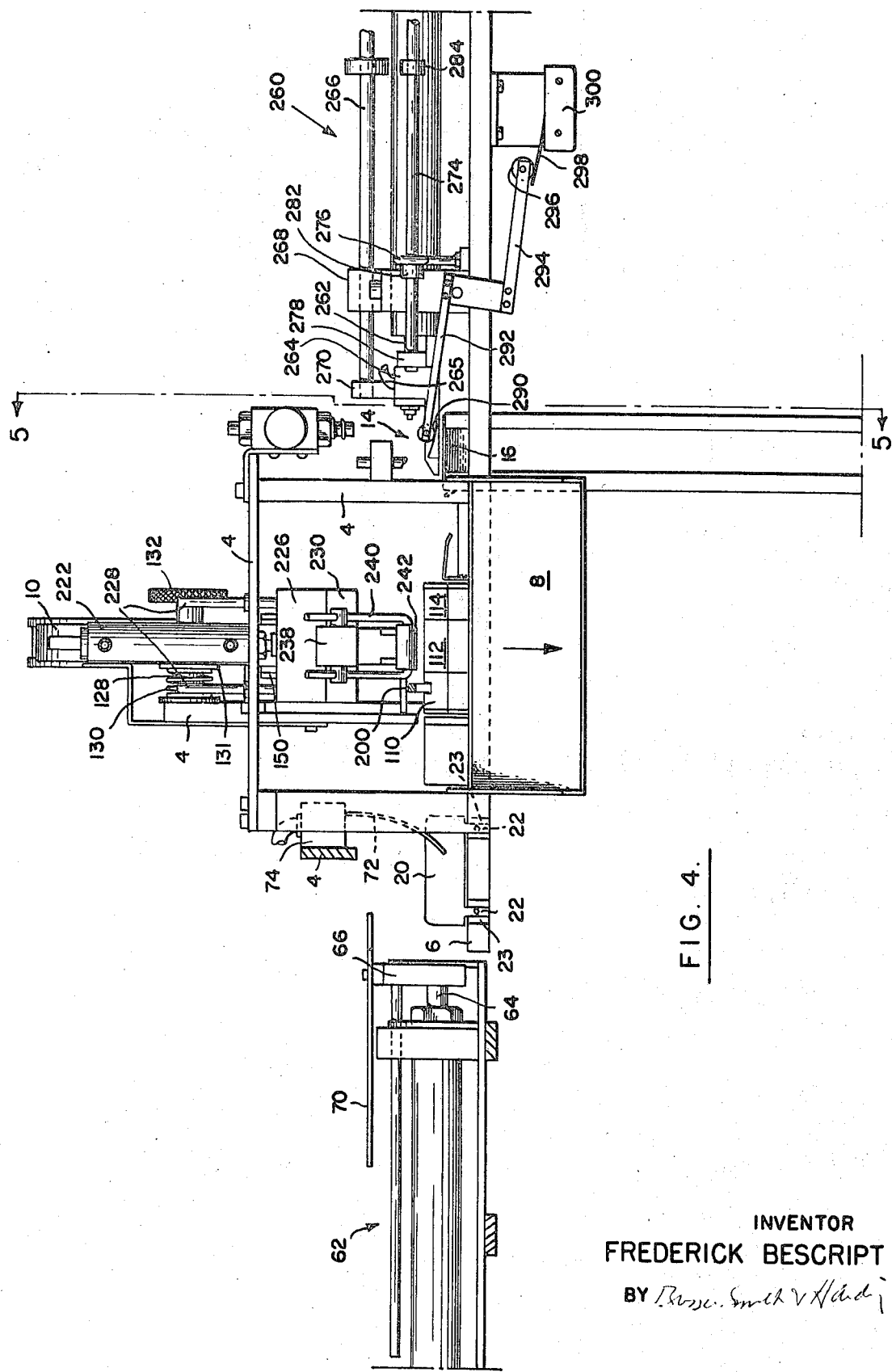
FIG. 4 is a front elevation, partially broken away, of the machine of FIG. 1.

Double acting air ram 68 has a rod 80 (FIG. 2) which is secured to a block 82 which in turn is secured to pusher arms 86 and 88. A pusher block 90 is fixedly secured to arm 86 and a pusher block 92 is fixedly secured to pusher arm 88. A T-shaped pusher element 96 has a pusher portion 98 lying between pusher blocks 90 and 92 and is fixedly secured to rods 100 and 102 each of which is slidably mounted in an opening 104 in block 82. A compression coil spring 106 surrounding each of rods 100 and 102 urges member 96 forwardly against blocks 90 and 92. As indicated in FIG. 4 (see also FIG. 5) the forward faces 110, 112 and 114 of block 92 pusher portion 98 of element 96 and block 90, respectively, are generally V-shaped with the apex of the V to the rear. A bar 116 secured to the rear of pusher element 96 slides on table 6 passing under ram 68 and having a stop pin 117 which engages ram support 118 to limit the forward travel of pusher element 96 to prevent its interfering with the bonding operation.

Figure 5:
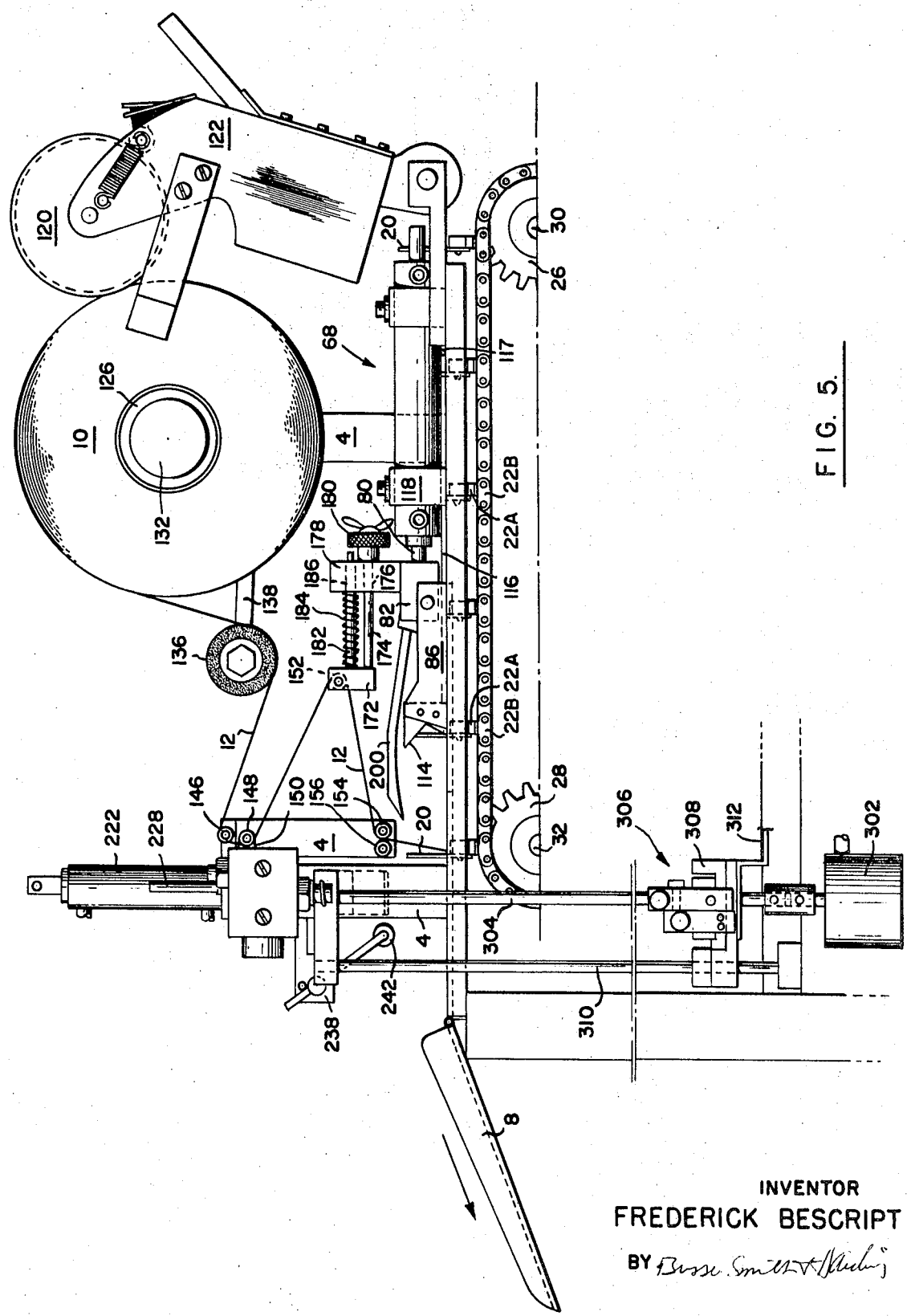
FIG. 5 is a vertical section, partially broken away, taken on the plane indicated by the line 5—5 in FIG. 1.

Referring now to FIG. 5, the banding strip 12, if desired, can be given an identifying marking for each band to be formed by a printing roller 120 supplied with ink from a reservoir 122 in a conventional manner. Roll 10 of banding strip 12 is mounted on a drum 126 which rotates on a shaft 128 (FIG. 4) secured to frame 4. A compression coil spring 130 about shaft 128 bears against frame 4 and hollow boss 131 on drum 126 to act as a friction break on the drum, the amount of friction being adjusted in a conventional manner by a knurled nut 132 threaded to shaft 128.

As best seen in FIG. 3, strip 12 passes below a drag roll 136 mounted on a lever 138 which is pivotally connected at 140 to frame 4. The height of drag roll 136 is determined by a stop screw 142 which is threaded to a bar 144 secured to frame 4, lever 138 resting on screw 142. Strip 12 then passes about a guide roller 146 secured to frame 4 and a guide roller 148 secured to arms 150. Strip 12 then passes about a roller 152 and between rollers 154 and 156 secured to frame 4 and thence downwardly through opening 158 in table 6 which is best seen in FIG. 7.

Referring now to FIG. 5, guide roller 152 is mounted on a block 172 which is fixedly secured to a rod 174 which passes freely through an opening 176 in block 178 mounted on block 82. An adjustment nut 180 is threaded to the right hand end of rod 174 as seen in FIG. 5. Block 172 is also fixedly secured to a rod 182 which is surrounded by a compression spring 184 to bias block 172 to the left as viewed in FIG. 5. Rod 182 passes freely through opening 186 in block 178.

Referring now to FIG. 11, a holddown lever 200 is pivotally secured at 202 in a slot 204 in block 82. The right-hand end of lever 200, as viewed in FIG. 11, is biased downwardly by means of a compression coil spring mounted in block 82 and engaging lever 200. A cam follower roller 208 mounted on the left-hand end of lever 200, as viewed in FIG. 11, is adapted to engage a cam member 210 secured to table 6 to cam the right-hand end of lever 200 upwardly when block 82 is in the retracted position.

Figure 7:
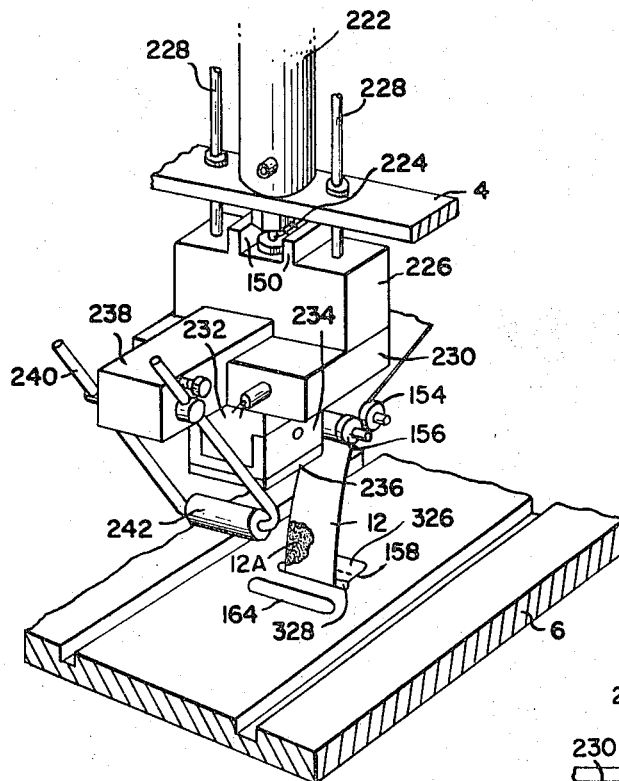
FIG. 7 is a front perspective view of the sealing mechanism of the machine of FIG. 1.
Figure 8:
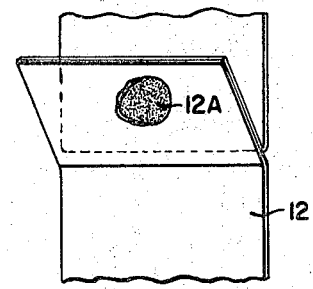
FIG. 8 is a front perspective view of the strip of banding material remaining after the band has been applied.
Figure 10:
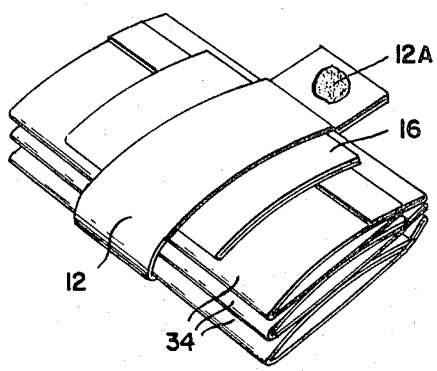
FIG. 10 is a top perspective view of a stack of items banded together.

Referring now to FIG. 7, a double acting air ram 222 has a ramrod 224 secured to a block 226 of heat insulation material which has secured thereto arms 150 carrying roller 148. A heater indicated at 230 is secured to block 226 and in turn is in heat conducting relationship with a block 232 which is secured to a U-shaped member 234 to which is attached a hardened steel anvil 236. A bar 238 secured to block 226 and to block 232 carries a U-shaped member 240 on which is mounted a roll 242.

As best seen in FIG. 4, a double acting air ram 260 has a ramrod 262 connected to a vacuum pickup head 264 which has a self contained vacuum cut off valve (not shown) within the head. A vacuum line 265 is attached to head 264. A guide rod 266 passes through fixed guide member 268 and is connected to a block 270 which in turn is connected to head 264. A rod 274 passes through guide member 276 and is secured to a block 278 which in turn is fixedly secured to operating stem 280 (FIG. 2) of the valve contained in pickup head 264. Stop members 282 and 284 are fixedly secured to rod 274, and are adapted to engage guide member 276 to move step 280 and operate the associated valve.

As seen in FIG. 4, a follower element 290 positioned over magazine 14 is secured to a pivoted lever 292 to which is secured an arm 294 carrying a roller 296 adapted to engage switch arm 298 of switch 300. Switch 300 controls motor 302 (FIG. 5) connected to a threaded rod 304 engaged by a quick coupling split traveling nut 306. Nut 306 is connected to a block 308 which is guided by a guide rod 310 and carries a circular supporting platform 312. This arrangement of elevating circulars to always maintain a circular at the top of the magazine is essentially conventional, per se.

Figure 6:
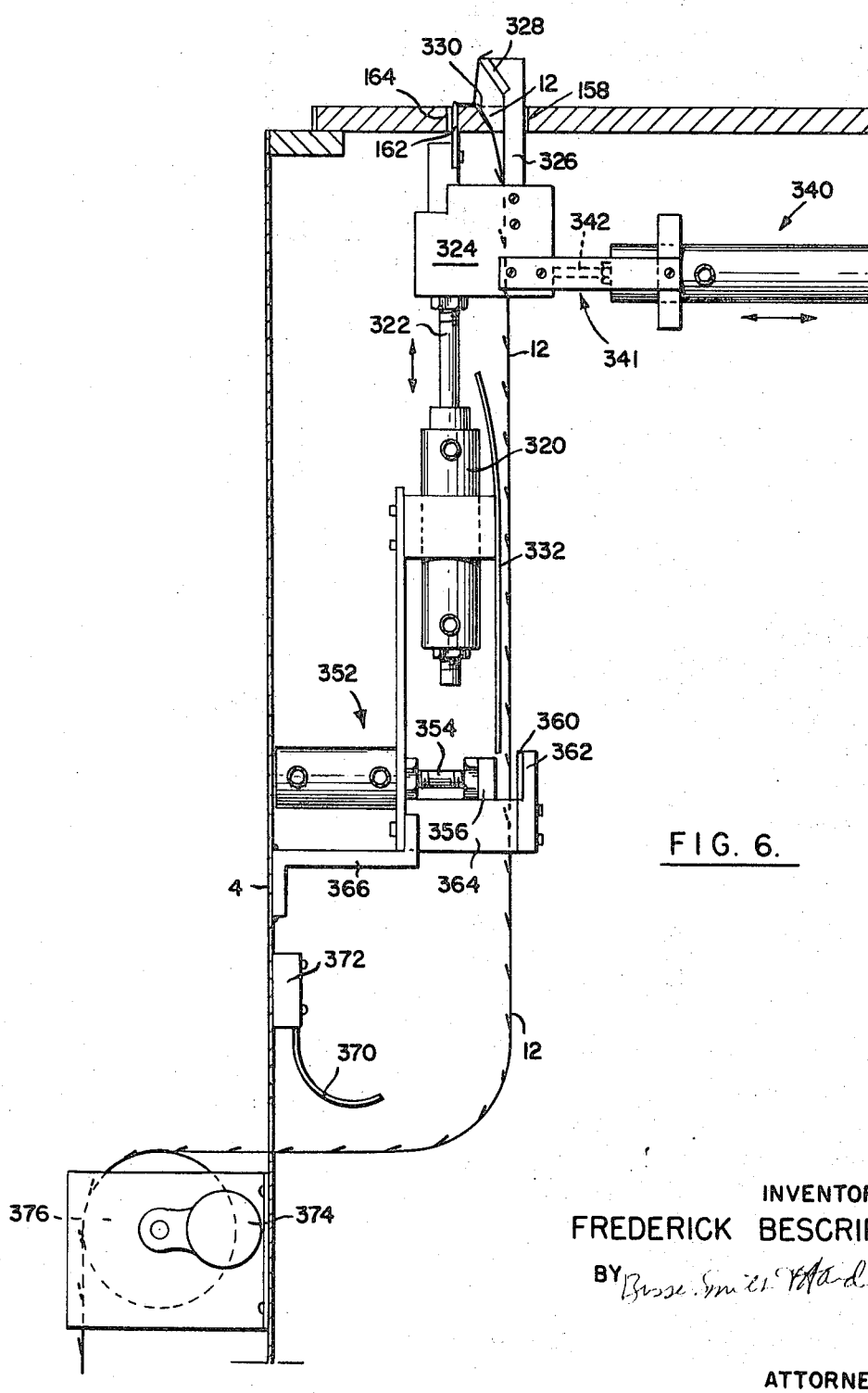
FIG. 6 is a vertical section taken on the plane indicated by the lines 6—6 in FIG. 4, partially broken away.

Referring now to FIG. 6, a double acting air ram 320 has a rod 322 secured to a U-shaped block 324 to which is also secured a tape holding member 326 having a sloping insert face 328 adapted to cooperate with face 330 of opening 158. Advantageously, the insert 328 is of a slippery nonstick material of a low coefficient friction such as, for example, a synthetic resin such as a fluoro plastic, for example, polytetrafluoroethylene, fluorinated ethylene-propylene and chlorotrifluoroethylene. A strip guide 332 extends downwardly along ram 320. A ram 340 mounted on a frame 341 secured to block 324 has a rod 342 connected to a block 344 (see FIG. 9) which has an insert face 346 of a material having a nonstick surface such as a fluoro plastic which is adapted to hold the strip 12 against block 324.

As seen in FIG. 6, a ram 352 has a rod 354 connected to a block 356 which is adapted to hold strip 12 against the nonstick insert face 360 of block 362 which is fixedly secured to a bracket 364 connected to frame 4 by a bracket 366.

As seen in FIG. 6, strip 12 passes beneath switch arm 370 of switch 372 which controls a motor 374 which drives a take up roller 376 over which strip 12 passes.

CONTROL CIRCUIT AND OPERATION

Figure 12:
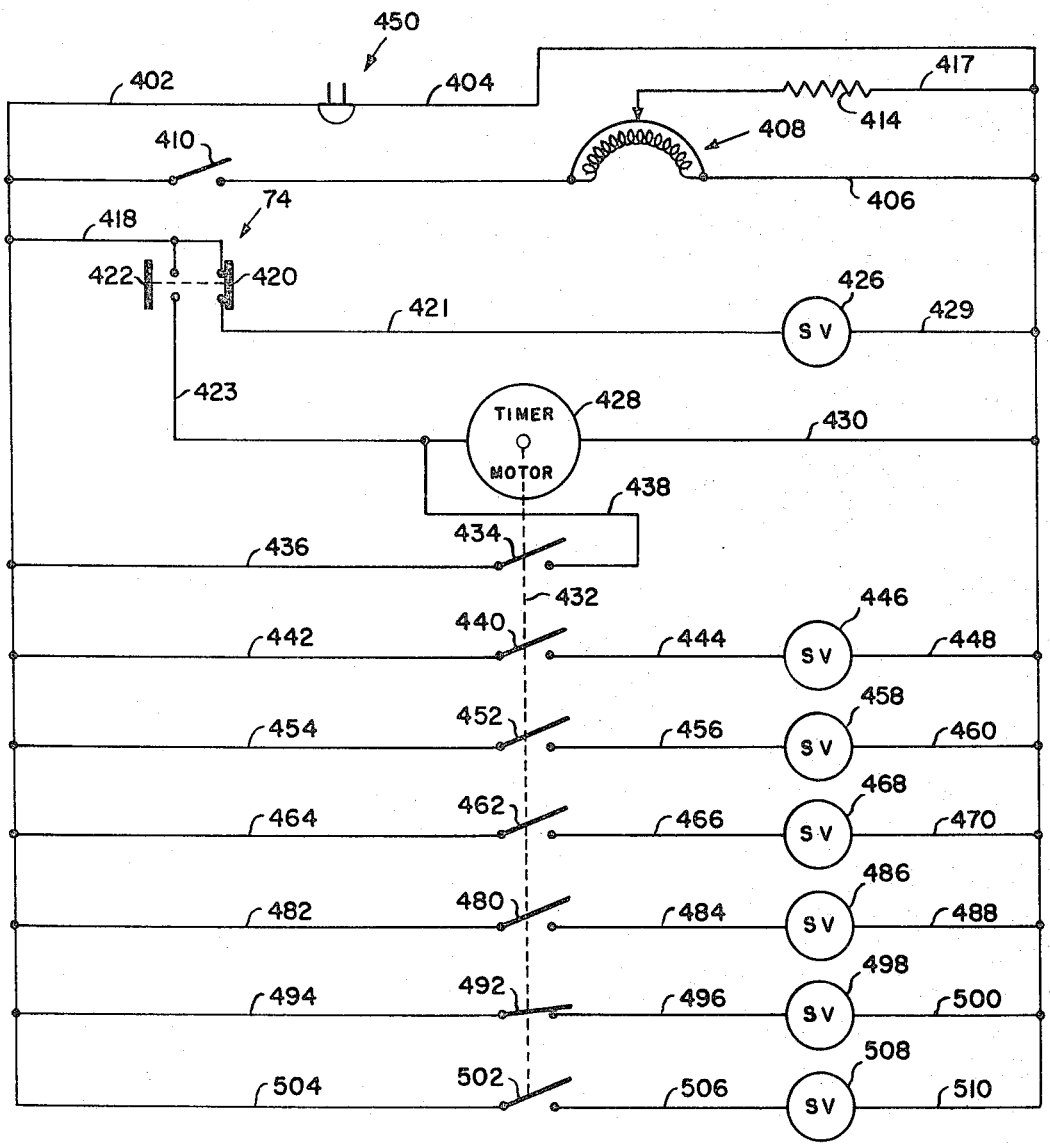
FIG. 12 is a wiring diagram of the control circuit of the machine.

The operation of the banding machine 2 will now be discussed in conjunction with the control circuit shown in FIG. 12.

A conventional plug 14 is wired to lines 402 and 404. Line 406 which runs between lines 402 and 404 contains a rheostat 408 and a manually operated switch 410. The rheostat is connected to a resistance element 414 of previously mentioned heater 230 which in turn is connected by line 417 to line 404. Switch 410 is closed a few minutes before operating the machine to bring the heater to the desired temperature which may be controlled by a thermostat if desired.

Previously discussed switch 74 is connected to line 402 by line 418 and has blades 420 and 422 for connecting line 418 to line 421 and 423, respectively. Switch 74 is normally biased to close the circuit to line 421 and open the circuit to line 423.

Line 421 is connected to solenoid valve 426. Line 430 connects valve 426 to line 404. Solenoid valve 426 controls the flow of air to and from ram 40 so as to extend ramrod 46 when solenoid valve 426 is energized and retract rod 46 when it is deenergized. As rod 46 moves outwardly, pawl 52 engages the outermost chain 24 causing the rotation of sprockets 26, 26 and 28, 28 and the chains 24 to advance pusher members 2 until a stack of samples 34 engage switch 74 to open the circuit to solenoid valve 426 causing the reversal of the flow of air to and from ram 40 and the retraction of ramrod 46 with pawl 52 disengaged from its associated chain 24.

At the same time, the actuation of switch 74 by the engagement of switch arm 72 by samples 34 causes blade 422 to close which connects line 418 to a timer motor 428 connected to line 404 by line 429. Thus the closing of switch element 422 starts timer motor 428 operating. Timer motor 428 drives a shaft indicated by construction lines at 432 which actuates a series of cam controlled switches in a conventional manner to provide the desired timing for the machine elements.

Cam operated switch 434 is in a holding circuit being connected by a line 436 to line 402 and to line 423 by line 438. Switch 434 is cammed closed immediately after timer motor 428 starts and remains closed until the timer motor has rotated approximately 360 degrees.

Cam operated switch 440 is connected to line 402 by a line 442 and by line 444 to a solenoid valve 446 which is connected to line 404 by a line 448. Shortly after switch 434 closes, switch 440 is closed to energize solenoid valve 446 which controls the flow of air to and from both rams 62 and 260. The energization of solenoid valve 446 causes ramrod 64 to be extended and head 66 to push an adjacent stack of samples 34 across the top of table 6 to a position in line with the center line of ram 68. Similarly, the energization of solenoid valve 446 causes ramrod 262 to be extended which in turn causes suction head 264 to carry a circular 16 to a position immediately above the stack of samples mentioned immediately before. As the suction head 264 reaches the center line of ram 68, stop 284 (FIG. 4) on rod 274 engages guide 276 to arrest the movement of rod 274 thus causing valve stem 280 to stop and close off the head 264 from vacuum line 265 causing the circular to be released on the upper most sample 34. Rams 62 and 260 are selected so that the speed of ram 62 insures the arrival of the samples before the arrival of the circular. Shortly thereafter, switch 440 opens to deenergize solenoid valve 446 and reverse the flow of air to rams 62 and 260 causing the retraction of head 66 and head 264. When stop 282 (FIG. 4) engages guide 276 the movement of valve stem 280 is arrested causing the reconnection of head 264 to vacuum line 265 which in turn causes head 264 to grip by vacuum a circular 34. The retraction of head 66 causes arm 70 to release its hold on switch arm 72 (which it has maintained during the time ramrod 64 was extended) thus permitting blade 420 of switch 74 to close causing energization of solenoid valve 426 and the consequent advance of pushers 20 as described before. At the same time, switch blade 422 of switch 74 opens. This latter action does not stop timer motor 428 however since switch 434 is still closed.

Cam actuated switch 452 is connected to line 402 by line 454 and by line 456 to solenoid valve 458 which is connected to line 404 by line 460. Solenoid valve 458 controls the flow of air to and from ram 352 (FIG. 6). Switch 452 is closed before the extension of ram 68 to cause the extension of ramrod 354 and block 356 to clamp strip 12 between it and insert 360 thus preventing any upward movement of strip 12.

Figure 9:
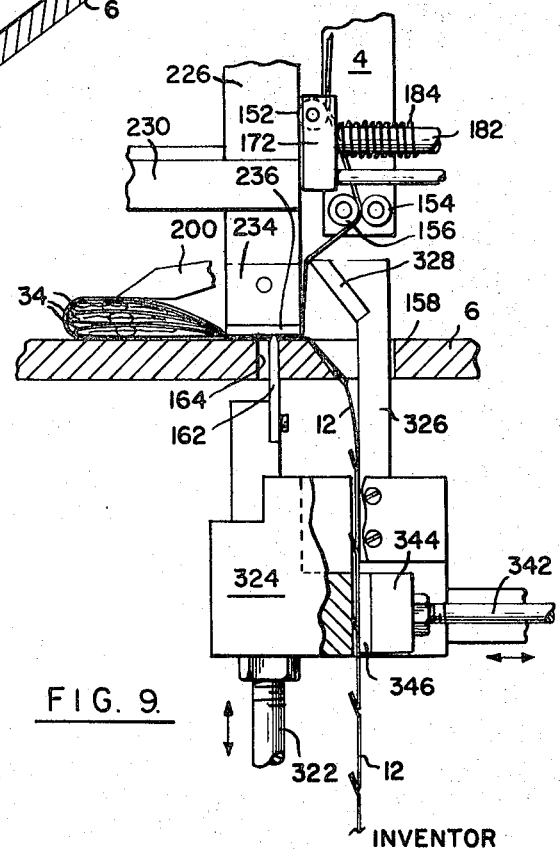
FIG. 9 is a vertical section, partially broken away, showing the sealing together of the strip of banding material and its severance.

Cam actuated switch 462 is connected to line 402 by line 464 and is connected by line 466 to a solenoid valve 468 which in turn is connected to line 404 by line 470. Solenoid valve 468 controls the flow of air to and from ram 68. After rams 62 and 260 have retracted, switch 462 is closed to energize solenoid valve 468 which reverses the flow of air to and from ram 68 causing ram rod 80 to extend, and advance block 82 and its associated elements including blocks 90 and 92 and portion 98 of element 96 all of which engage the stack of samples 34 and circular 16 and advance them to engage strip 12 and carry it to a point beyond heated anvil 236, element 96 being arrested short of the bonding elements by stop pin 117. Since pulley 152 is simultaneously being advanced this provides slack in strip 12 which permits the assembled material to override the strip which is being held beneath table 6 and wrap it around the circular 16 and samples 34 as shown in FIG. 9. As ram 68 is extended, cam follower roller 208 on arm 200 (FIG. 11) moves away from cam 210 causing the spring 206 to pivot arm 200 so that its outer end clamps down on top of circular 16. If block 172 is adjusted to an advanced position, roller 152 will engage block 226 and be arrested before ram 68 stops. When the ram is retracted, springs 184 urge block 172 to its original position.

Cam actuated switch 480 is connected to line 402 by lines 482 and by lines 484 to a solenoid valve 486 which in turn is connected by line 488 to line 404. Solenoid valve 486 controls the flow of air to and from ram 222. After ram 68 has moved to its fully extended position, switch 480 is closed to energize solenoid valve 486 and reverse the flow of air to and from ram 222 to cause ramrod 224 to be extended to carry block 226 and heated anvil 236 downwardly to the overlapped portions of strip 12 just to the rear of the assembly of samples 34 and circular 16 as shown in FIG. 9. Anvil 236 extends between blocks 90 and 92 into the area from which T-shaped member 96 was withdrawn. Strip 12 carries a thermally activated adhesive 12a (FIG. 7) which is now on the abutting faces of the overlapping portions of strip 12 and is activated by the heated anvil 236 to cause the overlapping portions of strip 12 to be secured together. Block 226 also carries down arms 150 and roller 148.

Prior to the completion of the heat sealing operation, switch 462 is opened causing the deenergization of solenoid valve 468 reversing the flow to and from ram 68 causing the retraction of ramrod 80 and the heat associated elements. The retraction of block 82 causes roller 152 to be retracted and pull the desired amount of strip 12 from roll 10. It will be noted that the amount of strip withdrawn from roll 10 can be adjusted by varying the position of nut 180. Roller 208 engages cam 210 causing the elevation of lever 200 (FIG. 11).

A cam actuated switch 492 is connected by line 494 to line 402 and by line 496 to a solenoid valve 498 which is connected by lines 500 to lines 404. Solenoid valve 498 controls the flow of air to and from ram 320. After ram 68 has retracted, switch 492 is closed to energize solenoid valve 498 which reversed the flow of air to and from ram 320 causing ramrod 322 to extend carrying upwardly block 324 and knife 162 which severs the heat sealed strip 12 between the limits of the bonded area so as to leave a complete band formed about the assembly of the samples and circular and yet leave a remaining portion of the severed strip portions secured together so as to retain the continuity of the strip above and below table 6 as is best seen in FIG. 9. As block 325 is elevated it also carries upwardly with it member 326 and clamping face 328 which frees the strip 12 so so that it can move below table 6.

After the cutting operation, switch 480 opens to deenergize solenoid valve 486 which causes the flow of air to and from ram 222 to be reversed which causes ramrod 224 and consequently anvil 326 and its associated elements to be raised including roller 148 the raising of which shortens the path of travel of strip 12 and thus provides necessary slack for the pulling of the cut portion of strip 12 below table 6.

Subsequently, switch 452 is opened causing the deenergizing of solenoid valve 458 and the reversal of the flow of air with respect to ram 352 causing the retraction of ramrod 354 and the unclamping of strip 12 by block 356.

A cam operated switch 502 is connected to lines 402 by a line 504 and by line 506 to a solenoid valve 508 which is connected to line 404 by line 510. Solenoid valve 508 controls the flow of air to and from ram 340. After switch 452 is opened, switch 502 is cammed closed to energize solenoid valve 508 and reverses the flow of air to and from ram 340 causing ramrod 342 to extend and cause insert head 346 to clamp strip 12 against block 325 (FIG. 9).

Subsequently, switch 492 is opened to deenergize solenoid valve 498 and reverse the flow of air to and from ram 320 causing the retraction of ramrod 322 and the consequent retraction of knife 162 and block 324. Similarly, clamping face 328 of member 326 is moved downwardly to clamp strip 12 against face 330 of opening 158. Due to the tight engagement between block 324 and insert 346, downward movement of block 324 (ram 340 moving bodily with block 324) carries strip 12 downwardly to carry below table 6 the severed and bonded area of strip 12. This results in slack in strip 12 in the vicinity of switch arm 370 causing switch 372 to be closed and motor 374 to rotate counterclockwise as viewed in FIG. 6 to advance the strip 12 to a discharge position until the slack is taken out of the lower portion of the strip which closes switch 372 and stop motor 374.

After the retraction of ram 320, switch 502 is opened causing the retraction of ram 340. Subsequently, switch 434 in the holding circuit opens and if a new stack of samples 34 has closed blade 422 of switch 74, the timer motor continues and the cycle is repeated. Otherwise, the timer motor stops until a stack of samples closes blade 422.

During each cycle of the machine, the stack of samples and the circular being advanced into the position where the bonding operation is carried out pushes the already banded stack of samples and circular on to discharge chute 8 which, by force of gravity, acts to discharge the banded material at a desired location.

Advantageously, roller 242 is attached to the machine as shown, for example, in FIG. 7 and acts to roll the stack of partially banded samples and circular to a flatter condition to permit tighter banding.

It will be understood that the above described embodiment is illustrative and is not intended to be limiting.

What is claimed is:

1. A banding machine comprising:
   means to position a stack of items in a path,
   means supplying a strip of banding material downwardly through said path,
   reciprocating means to advance the stack of items along said path and against the strip to wrap the strip about the stack of items,
   a holddown lever mounted on the advancing means and means to urge the holddown lever against the top of the stack during the advance of the advancing means and to raise the holddown lever when the advancing means is moved back to its original position,
   means to grip the band below said path during the advance of the stacked items, and
   means to bond together overlapped portions of the strip adjacent the stack and make a single cut intermediate the ends of said overlapped portions to leave a band about the items and the cut portions of the strip bonded together.

2. A banding machine comprising:
   means to position a stack of items in a path,
   means supplying a strip of banding material downwardly through said path,
   reciprocating means to advance the stack of items along said path and against the strip to wrap the strip about the stack of items,
   means to grip the band below said path during the advance of the stacked items, and
   means to bond together overlapped portions of the strip adjacent the stack and make a single cut intermediate the ends of said overlapped portions to leave a band about the items and the cut portions of the strip bonded together,
   said means supplying the strip of banding material having means to rotatably mount a roll of said material and having means to supply a predetermined amount of slack in the portion of the strip adjacent the path to provide a sufficient length of strip for the wrapping of the strip about the stack of items, said last mentioned means being mounted on the advancing means and engaging the strip between the means to mount said roll and the path so as to withdraw a portion of the strip from the roll as the advancing means moves from its advanced position back to its starting position and to provide slack in the strip as the advancing means advances.

3. A banding machine comprising:
   means to position a stack of items in a path,
   means supplying a strip of banding material downwardly through said path,
   means to advance the stack of items along said path and against the strip to wrap the strip about the stack of items,
   means to grip the band below said path during the advance of the stacked items, and
   means to bond together overlapped portions of the strip adjacent the stack and make a single cut intermediate the ends of said overlapped portions to leave a band about the items and the cut portions of the strip bonded together, and
   means to remove the cut portions of the strip comprising means adapted to move downwardly adjacent cut portions of the strip lying below the said path and means to clamp the said portions of the strip to said downwardly moving means for a predetermined period of time.

References Cited

UNITED STATES PATENTS

| 2,739,433 | 3/1956 | Hopton et al. | 53—258X |
| 3,097,462 | 7/1963 | Langdon | 53—198X |
| 3,164,937 | 1/1965 | Ingram | 53—229 |
| 3,377,772 | 4/1968 | Lyon et al. | 53—229 |
| 3,001,348 | 9/1961 | Rado | 53—182 |
| 3,457,132 | 7/1969 | Tuma et al. | 53—182X |

THERON E. CONDON, Primary Examiner

N. ABRAMS, Assistant Examiner

U.S. Cl. X.R.

53—157, 229